Acceleration As Measured With Rate Circuit
(Error Is Shaded Portion)

Time ⟶

United States Patent Office 2,858,493
Patented Oct. 28, 1958

2,858,493

RATE INERTIA COMPENSATION FOR REEL TENSION REGULATOR

Robert E. Hull and John W. Wallace, Buffalo, N. Y., and George W. Younkin, Fond du Lac, Wis., assignors to Westinghouse Electric Corporation, East Pittsburgh, Pa., a corporation of Pennsylvania Application June 15, 1956, Serial No. 591,729

11 Claims. (Cl. 318—143)

Our invention relates to electric systems of control and more particularly to improvements in drives generally referred to as Ward-Leonard drives.

In a number of industrial processes the inertia of the masses, the electric motor, or motors, is called upon to move during acceleration and deceleration of the masses deleteriously affects the processing operation. A typical example of an application where the problem arises is in the metal rolling mill art. In an application of this type the tension of the material is deleteriously affected by the inertia during acceleration and deceleration.

Accurate tension control, or regulation, during periods of acceleration and deceleration has been a difficult task. Current regulators for tension control have been recalibrated to provide accelerating current by means of speed rate circuits, or by use of contactors to adjust the regulating current predetermined amounts at specific times according to the compensation requirements. These methods of procedure, however, do not completely provide for accurate tension control. Tensiometers have also been used to accurately measure the regulated tension, however, time delays in the measuring means allow for tension errors during the acceleration and deceleration periods.

One broad object of our invention is the provision of accurate inertia compensation of such character that substantially no operating errors in a process are introduced during periods of acceleration and periods of deceleration of the process.

A more specific object of our invention is the provision of a forcing function of a magnitude and sign sufficient of a change in the current in a motor armature circuit to thus provide the necessary torque when it is needed during periods of speed change.

A further somewhat specific object of our invention is the provision of a sufficient processing line speed rate signal with a forcing function to overcome the time delays in the measuring means in a system of control as contemplated.

A further somewhat specific object of our invention is the provision of providing double rate inertia compensation in a system as contemplated.

Other objects and advantages will become more apparent from a study of the following specification and the accompanying drawings, in which.

Figure 1:
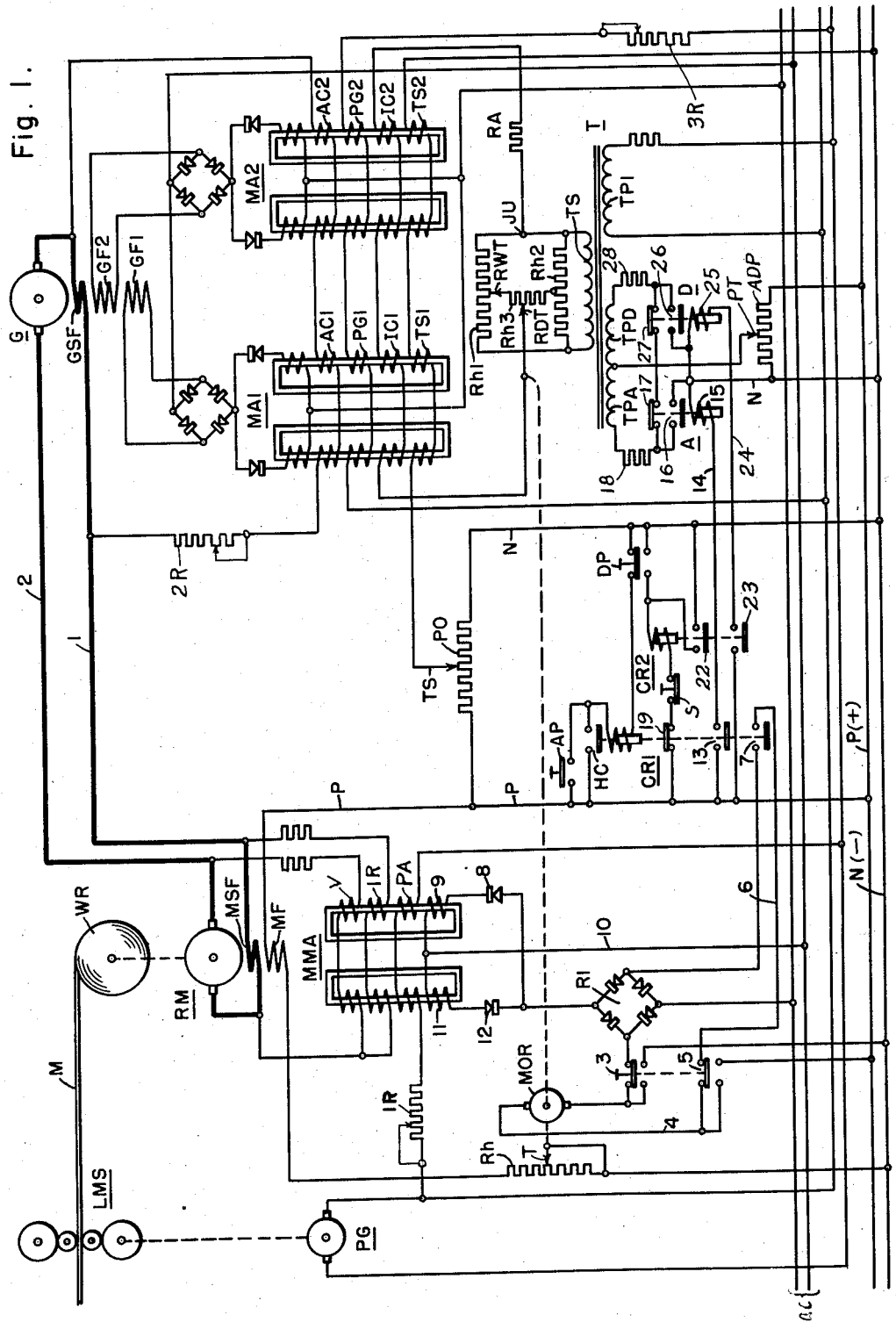
Fig. 1 is a diagrammatic showing of a tandem-mill reel control system provided with our invention.

In Fig. 1 the material M is shown as passing from the last mill stand LMS to the windup reel WR which is driven by the reel motor RM. The reel motor armature is connected in a loop circuit with the armature of the generator G, which loop circuit may be traced from the right-hand armature terminal of the generator G through the generater series field GSF, conductor 1, the motor series field MSF, the armature of the reel motor RM, and conductor 2 to the left-hand armature terminal of the generator G.

The excitation of the motor field winding MF is controlled by the motor controlling magnetic amplifier MMA, the output of which is supplied to the armature of the rheostat operating motor MOR. The field circuit may be traced from the positive conductor P through the field winding MF, the rheostat Rh to the negative conductor N. The position of the rheostat arm, or tap T, is, of course, determined by the operation of the motor MOR.

The armature circuit for the motor MOR may be traced as follows: When the upper A. C. supply conductor is positive the current flows through the lower left-hand section of rectifier R1, switch 3, the armature of motor MOR, conductor 4, switch 5, conductor 6, switch 7 of control relay CR1, which will be closed during normal operation, the upper right-hand section of rectifier R1, rectifier 8, load winding 9 and conductor 10 to the lower conductor of the A. C. supply. When the lower conductor of the A. C. supply is positive the circuit is through conductor 10, the load winding 11, rectifier 12, the upper left-hand section of the rectifier R1, switch 3, the armature of the motor MOR, conductor 4, switch 5, conductor 6, switch 7, the lower right-hand section of rectifier R1 to the upper A. C. conductor.

The magnetic amplifier MMA has three control windings. One control winding, which might be termed the pattern winding PA, is through a suitably adjusted resistor R, connected directly across the output terminals of the pilot generator. The second control winding IR is connected directly across the motor series winding MSF and thus provides a control effect as a function of motor load current. The third control winding V is connected directly across the armature terminals of motor RM and thus provides a control effect as a function of the counter electromotive force of this motor.

The foregoing control per se is well known in the art and is usually designated the counter-electromotive force control and as such, for steady state operation, provides, together with some control effects the motor MOR produces on the generator G, for a constant motor armature current and thus for constant strip tension.

The pilot generator PG is coupled to the last mill stand and thus provides a voltage output which is a function of the mill speed. The pilot generator thus produces a control effect on the magnetic amplifiers MMA and MA1 and MA2 as a function of the mill speed.

Before going into the details of the control of the voltage output of the generator G some discussions of the physical theory back of our contribution will be most helpful.

Strip tension is provided through the torque developed by the motor RM.

Tension, or $$T = \frac{Tq}{r}$$

where $r$=radius of rotation taking into account gear ratios, etc., and where $Tq$=torque producing the tension at the $r$ radius.

The motor RM must, during periods of speed change, provide for accelerating torque in addition to tension torque, otherwise part of the tension torque will be used as accelerating torque with the result that the tension will change, which is to be avoided.

The torque required to accelerate is given as:

$$T_q = \frac{J\alpha}{g} = \frac{Ja}{60rg}$$

where $J$ = load inertia to motor,
$\alpha$ = acceleration,
$g$ = acceleration due to gravity,
$a$ = strip acceleration.

The value of $$\frac{J}{60rg}$$

is generally accurately known and is a function of materials and dimensions of machine rolls, gears, rotors, coils of material being wound, etc. When the value of $$\frac{J}{60rg}$$

changes during operation, its value at any time is generally accurately known. Circuits can and have been devised to accurately provide for the value of $$\frac{J}{60rg}$$

as a function of operating conditions or time. The problem, then, remains to measure "$a$," or the rate of change of speed.

Figure 2:
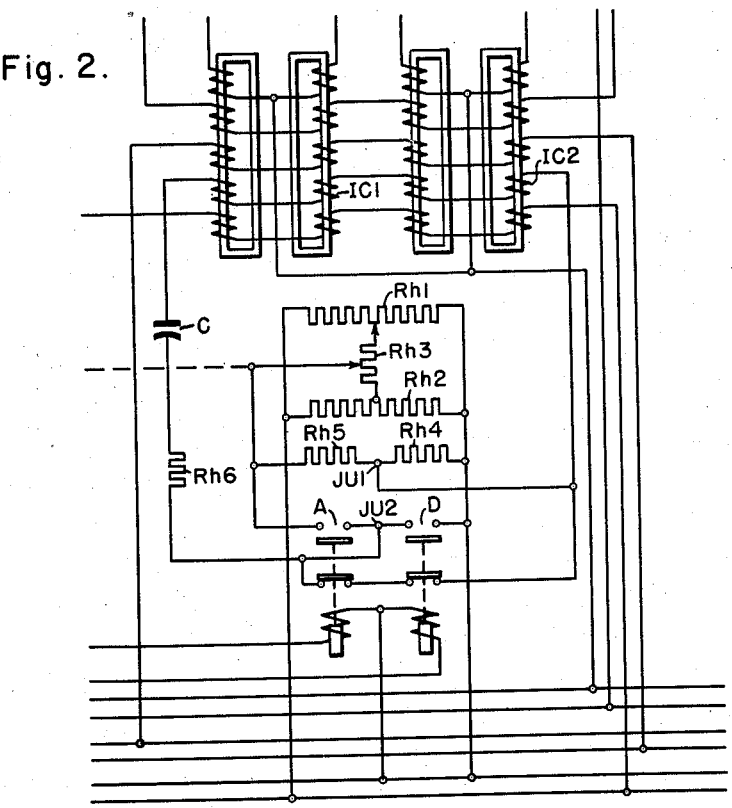
Fig. 2 is a diagrammatic showing of a modification of our control, as it could be applied to the showing in Fig. 1.
Figure 3:
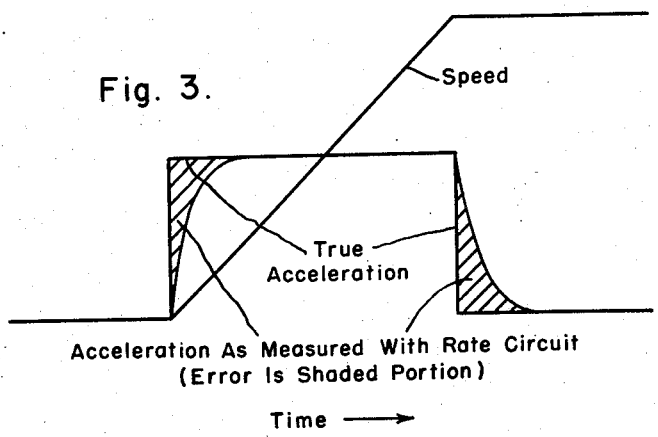
Fig. 3 shows some curves illustrating one phase of our contribution to the art.

One method for measuring "$a$" is to use a rate circuit, either a damping transformer, as we show in Fig. 1, or an R-C circuit as we show in Fig. 2, to measure the rate of change of a tachometer voltage, or pilot generator voltage, developed by a pilot generator coupled to the last mill stand. This circuit arrangement is satisfactory only to a limited extent because of the time delay inherent in any rate measuring circuit, the output of the circuit during periods of acceleration change, lags the true acceleration of the drive, with the result that tension errors are produced. The error, when using this method of inertia compensation, is evident in drives accelerated at constant rates when the speed changes from zero to a constant speed rate and when the acceleration changes back to zero again. This condition we illustrate in the idealized showing in Fig. 3.

The voltage output of the generator G is mainly controlled by the field windings GF1 and GF2 which are connected to the output circuits of the magnetic amplifiers MA1 and MA2, respectively.

The two magnetic amplifiers MA1 and MA2 each have four control windings, namely AC1, PG1, IC1 and TS1, and AC2, PG2, IC2 and TS2, respectively.

The windings AC1 and AC2 are, through a suitably adjusted resistor 2R, connected directly across the generator series field winding GSF and thus produce a control effect as a function of the load current. The windings PG1 and PG2 are, through a suitably adjusted resistor 3R, connected to the pilot generator. These two windings thus produce a control effect as a function of the mill speed.

A potentiometer PO is connected directly across conductors P and N. The control windings TS1 and TS2 are, through an adjustable tap TS on the potentiometer, connected for any degree of energization within the range of the potentiometer. The tap TS is the tension selector tap and is adjusted for the tension required on the strip.

The control circuitry thus far discussed provides no inertia compensation. To effect the improvements in inertia compensation we provide the transformer T. This transformer has the primary winding TP1 and the secondary winding TS. Since the primary winding TP1 is connected to the output leads of the pilot generator PG the output of the transformer secondary will be a function of the rate of change of the mill speed and thus the speed of the rotating parts driven by the motor RM. Since the reels may have various widths we provide a reel width adjusting tap RWT on the resistor R$h$1 of the resistor bridge circuit including the resistors R$h$1, R$h$2 and R$h$3. Since the reel diameter changes as the material is wound on the reel core a continuous adjustment has to be made for reel diameter. This is effected by the tap RDT on the resistor R$h$3. The tap RDT is coupled to the motor MOR.

The inertia compensating control windings IC1 and IC2 are connected in a circuit that may be traced from the junction JU, resistor RA, inertia compensating winding IC2 of the magnetic amplifier MA2, inertia compensating winding IC1 of the magnetic amplifier MA1 to the reel diameter adjusting tap RDT.

If there were no time delays and possibly other harmful operating characteristics, the circuitry so far disclosed should suffice, but for the time delays the idealized situation illustrated by the curve designated "True Acceleration" is not realized but the rate circuit measures rate as indicated by the arcuate curves, and an error indicated by the shaded portion is introduced.

To eliminate this error we provide a second pair of primary windings, namely TPA and TPD. During acceleration winding TPA provides a voltage surge of the right magnitude and polarity to eliminate the shaded portions shown in Fig. 3. During deceleration the winding TPD provides a voltage surge of the right magnitude and polarity to eliminate the shaded portions shown in Fig. 3.

An acceleration-deceleration control potentiometer ADP is connected directly across the leads P and N. A positive potential tap PT is connected at a selected point on this potentiometer ADP and, as shown, connects the right-hand terminal of primary winding TPA and the left-hand terminal of primary winding TPD to a selected point on the potentiometer.

Assuming the strip is threaded through the mill and connected to the reel core and the attendant wishes to accelerate the equipment to operate at full speed, he sets up the necessary starting circuits which includes as a final step the closure of the switch AP. Closure of switch AP establishes a circuit from conductor P through switch AP, the actuating coil of the control relay CR1, the decelerating switch DP to conductor N. Operation of the control relay CR1 establishes a holding circuit for the relay through contacts HC and also establishes a circuit from conductor P through contacts 13, conductor 14, actuating coil 15 of the accelerating contactor A to the lead N. The accelerating contactor A thus operates to open its contacts 17 and to close its contacts 16. The closure of contacts 16 establishes a circuit from the positive tap PT, through the primary winding TPA, resistor 18, contacts 16 to the negative conductor N. The transformer primary TPA is thus energized. This winding thus applies a step voltage, namely a voltage surge, to the rate measuring transformer. The circuit parameters of the circuit components involved are so chosen that an output voltage is developed that exactly cancels out the shaded areas shown in Fig. 3, thus leaving a true accelerating signal. The time delay for this step signal, being the identical transformer delay, is exactly correct such that only the magnitude and polarity of the step needs to be adjusted.

When deceleration is to be effected, as for example when the reel is full, the switch DP is closed to drop out the control relay CR1. Since the operation of switch DP closes the lower contacts of this switch, an actuating circuit is established for the control relay CR2. This circuit may be traced from the positive lead P through the back contacts 19 of control relay CR1, the switch S, the actuating coil of control relay CR2 and the lower contacts of the switch DP, to the negative lead N.

Operation of the control relay CR2 effects the closing of contacts 22 and 23. The closure of contacts 22 establishes a holding circuit for control relay CR2, and the closure of contacts 23 establishes a circuit for the actuating coil 25 of the decelerating contactor D. The circuit for this contactor may be traced from the positive lead P through the contacts 23, the conductor 24, the actuating coil 25 of the decelerating contactor D, to the negative lead N. The operation of the decelerating contactor effects the opening of contacts 27 and the closing of contacts 26. The closure of contacts 26 establishes a circuit from the positive tap PT through the primary winding TPD, resistor 28, contacts 26 to the negative lead N. The primary winding TPD thus provides a voltage surge to provide the same function with respect to deceleration as is effected by primary winding TPA with respect to acceleration.

In actual systems the magnitude and timing of the step signal can be adjusted to provide forcing for other time delays, such as the delay of the current regulator, thus much improving the accuracy of tension control.

While Fig. 1 shows a rate transformer circuit, the basic control may also be effected by an R-C circuit.

The R-C circuit type of control is shown in Fig. 2. In this arrangement the bridge circuit, including the resistors Rh1, Rh2, and Rh3, is connected across the P and N and the inertia compensating windings IC1 and IC2 are connected in a circuit that may be traced from the junction JU1 between the resistors Rh4 and Rh5 through windings IC2 and IC1, capacitor C and resistor Rh6 to the junction JU2.

With tensiometers, when the accurate tension control can be achieved during all but the beginning and the end of an acceleration and deceleration period only the forcing step hereinbefore disclosed need be applied to the rate transformer to overcome the time delay of the tensiometer measuring device.

However, the ideal inertia compensating device calls for still greater improvements in many applications particularly where a tension signal is not used as in our circuitry. The rate method and circuitry hereinbefore disclosed is a decided improvement, but involves an additional time delay in the rate measuring circuit, such that the inertia compensating signal, where high fidelity is desired, comes not quite early enough and tension variations will occur at the beginning and end of the accelerating and decelerating periods.

Figure 4:
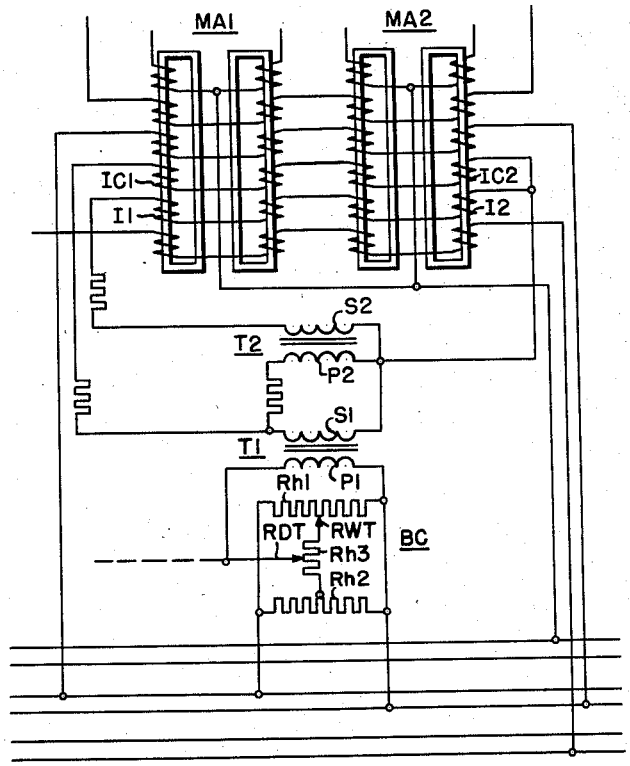
Fig. 4 shows a further modification including a refinement that may be used with the modification shown in Fig. 1.
Figure 5:
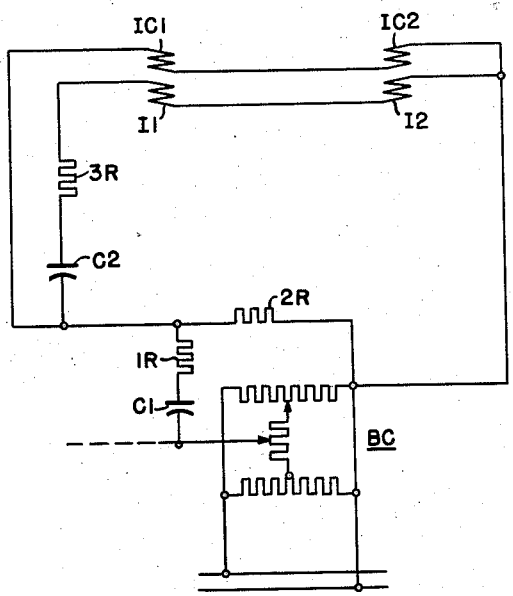
Fig. 5 is a showing of a modification of the refinement shown in Fig. 4.
Figure 6:
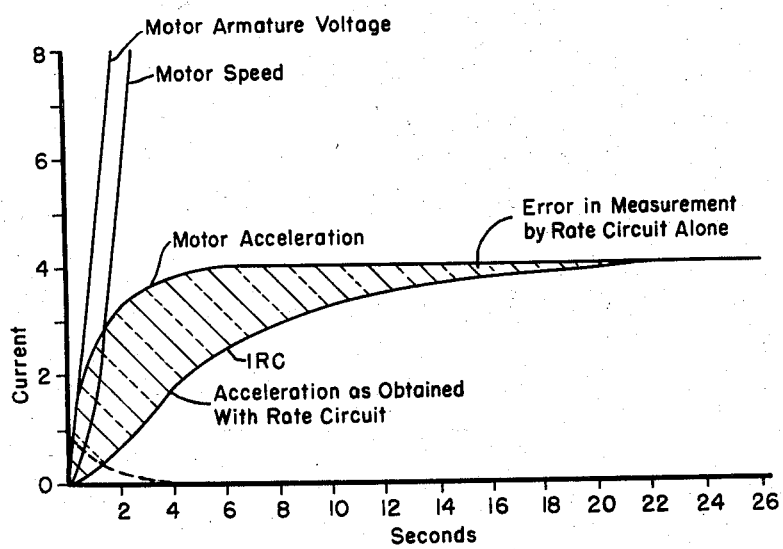
Fig. 6 shows some curves illustrating the further improvements that may be obtained with the showings in Figs. 4 and 5.

The subject matter shown in Figs. 4, 5 and 6 provides for an accurate inertia compensating signal containing a component proportional to acceleration and also a component proportional to rate of change of acceleration. This second component is proportional to the second derivative of speed, and may be called double rate inertia compensation.

The showing in Fig. 4 is a diagrammatic showing of the double rate inertia compensation using rate transformers. In this circuitry a resistor bridge circuit, like the one shown in Fig. 1 connected across the transformer secondary winding TS, is connected directly across the output circuit of the pilot generator. The resistors of this bridge circuit may thus also be designated as Rh1, Rh2 and Rh3 and the reel width adjusting tap may be designated RWT and the reel diameter adjusting tap by RDT.

A rate transformer T1 has its primary connected to the output circuit of the resistor bridge and the secondary winding S1 is connected in a loop circuit through a suitable resistor to the inertia compensating windings IC1 and IC2 of the magnetic amplifiers MA1 and MA2. The regular rate inertia compensation is thus provided for the control.

The secondary winding S1 through a suitable resistor is also connected to the primary winding of the rate transformer T2. The second rate transformer has a secondary winding S2 which is, through a suitable resistor, connected in a loop circuit with the control windings I2 and I1 of the magnetic amplifiers MA2 and MA1, respectively.

Fig. 6 shows a set of curves illustrating motor speed and the motor acceleration that would be obtained by differentiating the speed signal. If a single rate circuit is used, for example, considering the control effects of the windings IC1 and IC2 of Fig. 4 but not considering the control effects of windings I1 and I2, a signal following curve 1RC is obtained because of the time delay in the measuring system. The amount of error is indicated by the shaded area.

The double rate inertia compensation, effected by the control windings I1 and I2 provides a rate change of the acceleration curve. With a proper design of the rate and double rate circuits, the double rate circuit will provide a signal to fill in the shaded area and thus provide a net signal that closely approximates the true motor acceleration.

The double rate circuit effect is not limited to the double use of rate transformers, but R-C circuits may be used for accomplishing the same result.

The R-C circuitry is shown in Fig. 5. In the showing in Fig. 5 the bridge circuit BC is connected to the output of the pilot generator. The output of the bridge circuit is connected through the capacitor C1 and 1R to the inertia compensating windings IC1 and IC2 of the magnetic amplifiers. The resistor 2R is also connected to the capacitor C1 and 1R and as interconnected with the R-C circuit including the capacitor C2 and 3R provides a double rate signal to the compensating windings I1 and I2.

While we have shown and described only two embodiments of each the rate and double rate inertia compensating circuitry our invention is not limited to the exact circuitries shown and described but covers still other modifications and embodiments falling within the scope and spirit of our invention.

We claim as our invention:

1. In an electric system of control, in combination, a motor having its rotor coupled to drive a load, a generator having its armature connected in a loop circuit with the motor armature, a pilot generator mechanically coupled to the motor to produce, during acceleration of the motor, a rising voltage substantially proportional to the change in speed of the motor, a speed rate responsive device connected to the pilot generator to produce a control effect of the same sign as the change in motor speed, field windings for the generator, magnetic amplifier means for exciting the generator field windings, control means for the magnetic amplifier means connected to the rate responsive device to effect an output component of the magnetic amplifier of the same sign as the motor speed change, generator excitation forcing control means connected to the rate responsive device and selected in magnitude and sign so as to provide an excitation component in the control means for the magnetic amplifier means to effect a rise in voltage of the generator to compensate substantially exactly for the inertia of the load.

2. In a voltage control system, in combination, a generator having field winding means the excitation of which is to be controlled, motor means coupled to load mechanisms, said motor means being connected to said generator, voltage output means, having a control winding, connected to the generator field winding means, generating means coupled to the motor for producing a rising voltage during acceleration of the motor and the load mechanisms proportional to the change in speed of the motor, a rate circuit, connected to said generating means, for producing an output voltage at its output terminals, control means for supplying a voltage surge to the rate circuit of a magnitude and sign sufficient to anticipate the delays in the generating means, the rate circuit, and the voltage output means, and means for connecting the control winding of said voltage output means to the output terminals of the rate circuit, whereby the voltage output of said generator is increased substantially exactly in proportion to the acceleration of the motor means and the load mechanisms coupled thereto.

3. In a voltage control system, in combination, a generator having field winding means the excitation of which is to be controlled, motor means coupled to load mechanisms in which the moment of inertia value of the mechanisms changes, said motor means being connected to said generator, voltage output means, having a control winding, connected to the generator field winding means, generating means coupled to the motor for producing a rising voltage during acceleration of the motor and the load mechanisms proportional to the change in speed of the motor, a rate circuit, connected to said generating means, for producing an output voltage at its output terminals, control means for supplying a voltage surge to the rate circuit of a magnitude and sign sufficient to anticipate the delays in the generating means, the rate circuit, and the voltage output means, means for changing the voltage output of said rate circuit as a function of the changes in the moment of inertia value of the system comprising the motor means and the load mechanisms coupled thereto, and means for connecting the control winding of said voltage output means to the output terminals of the rate circuit, whereby the voltage output of said generator is altered substantially exactly in proportion to the acceleration of the motor means and the load mechanisms coupled thereto.

4. In a voltage control system, in combination, a generator having field winding means the excitation of which is to be controlled, motor means coupled to load mechanisms, said motor means being connected to said generator, voltage output means, having a first control winding and a second control winding, connected to the generator field winding means, generating means coupled to the motor for producing a rising voltage during acceleration of the motor and the load mechanisms proportional to the change in speed of the motor, a rate circuit, connected to said generating means, for producing an output voltage at its output terminals, and means for connecting the first control winding of said voltage output means to the output terminals of the rate circuit, a second rate circuit also connected to the output terminals of the first rate circuit, and circuit means for connecting the second control winding of said voltage output means to the output of the second rate circuit, whereby the voltage output of said generator is altered substantially exactly in proportion to the acceleration of the motor means and the load mechanisms coupled thereto.

5. In a voltage control system, in combination, a generator having a pair of oppositely wound field windings the relative excitation of which is to be controlled, a motor coupled to load mechanisms, said motor and generator having their armatures connected in a loop circuit, first voltage output means for one of the generator field windings, second voltage output means for the second generator field winding, said voltage output means each having a control winding, generating means coupled to the motor and thus producing, during acceleration, of the motor and load mechanisms, a rising voltage proportional to the change in speed of the motor and for producing, during deceleration of the motor and load mechanisms, a decreasing voltage proportional to the change in speed of the motor, a rate circuit having a plurality of input terminals and a plurality of output terminals, a pair of input terminals being connected to said generating means and the output terminals being connected to the control windings of said voltage output means, control means for supplying a voltage surge to a second pair of input terminals of the rate circuit, the electric characteristics of the control means and its connection to a second pair of input terminals of the rate circuit are both so selected that the magnitude and sign of the voltage surge is sufficient to anticipate the delays between the generating means and the generator field windings, and means for connecting the control windings of said voltage output means to the output terminals of the rate circuit, whereby the voltage output of said generator is altered substantially exactly in proportion to the magnitude and sign of the speed change of the motor and the load mechanisms coupled thereto.

6. In a voltage control system, in combination, a generator having a pair of oppositely wound field windings the relative excitation of which is to be controlled, a motor coupled to load mechanisms in which the moment of inertia value of the mechanisms changes, said motor and generator having their armatures connected in a loop circuit, first voltage output means for one of the generator field windings, second voltage output means for the second generator field winding, said voltage output means each having a control winding, generating means coupled to the motor and thus producing, during acceleration of the motor and load mechanisms, a rising voltage proportional to the change in speed of the motor and for producing, during deceleration of the motor and load mechanisms, a decreasing voltage proportional to the change in speed of the motor, a rate circuit having a plurality of input terminals and a plurality of output terminals, a pair of input terminals being connected to said generating means and the output terminals being connected to the control windings of said voltage output means, control means for supplying a voltage surge to a second pair of input terminals of the rate circuit, the electric characteristics of the control means and its connection to a second pair of input terminals of the rate circuit are both so selected that the magnitude and sign of the voltage surge is sufficient to anticipate the delays between the generating means and the generator field windings, means for changing the voltage output of said rate circuit in proportion to the changes in the moment of inertia value of the system comprising the motor and the load mechanisms coupled thereto, and means for connecting the control windings of said voltage output means to the output terminals of the rate circuit, whereby the voltage output of said generator is altered substantially exactly in proportion to the magnitude and sign of the speed change of the motor and the load mechanisms coupled thereto.

7. In a voltage control system, in combination, a generator having a pair of oppositely wound field windings the relative excitation of which is to be controlled, a motor coupled to load mechanisms, said motor and generator having their armatures connected in a loop circuit, first voltage output means for one of the generator field windings, second voltage output means for the second generator field winding, said voltage output means each having a first control winding and a second control winding, generating means coupled to the motor and thus producing, during acceleration of the motor and load mechanisms, a rising voltage proportional to the change in speed of the motor and for producing, during deceleration of the motor and load mechanisms, a decreasing voltage proportional to the change in speed of the motor, a rate circuit having a plurality of input terminals and a plurality of output terminals, a pair of input terminals being connected to said generating means and certain output terminals being connected to the first control windings of said voltage output means, and means for connecting the first control windings of said voltage output means to the output terminals of the rate circuit, a second rate circuit, also connected to the output of the first rate circuit, and circuit means for connecting the second control winding of said voltage output means to the output of the second rate circuit, whereby the voltage output of said generator is altered substantially exactly in proportion to the magnitude and sign of the speed change of the motor and the load mechanisms coupled thereto.

8. In a voltage control system, in combination, a generator having an armature and field windings, a motor having an armature connected in a loop circuit with the generator armature, generating means for generating a voltage proportional to motor speed whereby the voltage changes, either increasing or decreasing depending on whether the motor is accelerating or decelerating, a rate circuit connected to said generating means and having an output voltage of positive sense during motor acceleration and of negative sense during motor deceleration, means interconnected with the output of the rate circuit and the generator field windings for controlling the excitation of the generator field windings in sign and magnitude in accordance with the output of the rate circuit, control means for selectively supplying either a positive voltage surge during motor acceleration or a negative voltage surge during motor deceleration to the rate circuit, the magnitude of the surge being selected to anticipate the delays between the generating means and the generator field windings, whereby the voltage output of the generator is altered in magnitude and sign without delays proportional to the speed changes of the motor.

9. In a voltage control system, in combination, a generator having an armature and field windings, a motor having an armature connected in a loop circuit with the generator armature, generating means for generating a voltage proportional to motor speed whereby the voltage changes, either increasing or decreasing depending on whether the motor is accelerating or decelerating, a rate circuit connected to said generating means and having an output voltage of positive sign during motor acceleration and of negative sign during motor deceleration, means interconnected with the output of the rate circuit and the generator field windings and including a second rate circuit for controlling the excitation of the generator field windings in sign and magnitude in accordance with the output of the rate circuit, control means for selectively supplying either a positive voltage surge during motor acceleration or a negative voltage surge during motor deceleration to the rate circuit, the magnitude of the surge being selected to anticipate the delays between the generating means and the generator field windings, whereby the voltage output of the generator is altered in magnitude and sign without delays proportional to the speed changes of the motor.

10. In a voltage control system, in combination, a generator having an armature and field windings, a motor having an armature connected in a loop circuit with the generator armature, generating means for generating a voltage proportional to motor speed whereby the voltage changes, either increasing or decreasing depending on whether the motor is accelerating or decelerating, a rate circuit connected to said generating means and having an output voltage of positive sign during motor acceleration and of negative sign during motor deceleration, means interconnected with the output of the rate circuit and the generator field windings for controlling the excitation of the generator field windings in sign and magnitude in accordance with the output of the rate circuit, whereby the voltage output of the generator is altered in magnitude and sign without delays in proportion to the speed changes of the motor.

11. In a voltage control system, in combination, a generator having an armature and field windings, a motor having an armature connected in a loop circuit with the generator armature, generating means for generating a voltage proportional to motor speed whereby the voltage changes, either increasing or decreasing depending on whether the motor is accelerating or decelerating, a rate circuit connected to said generating means and having an output voltage of positive sign during motor acceleration and of negative sign during motor deceleration, means interconnected with the output of the rate circuit and the generator field windings and including a second rate circuit for controlling the excitation of the generator field windings in sign and magnitude in accordance with the output of the rate circuit, whereby the voltage output of the generator is altered in magnitude and sign without delays in proportion to the speed changes of the motor.

References Cited in the file of this patent

UNITED STATES PATENTS 2,600,308     Lund et al. _____ June 10, 1952